US012607647B2

(12) United States Patent (10) Patent No.: US 12,607,647 B2
Liao (45) Date of Patent: Apr. 21, 2026

(54) THREE-DIRECTIONAL ACCELEROMETER AND MANUFACTURING METHOD THEREOF

(71) Applicant: Citpo Technologies Co., Ltd., Taipei (TW)

(72) Inventor: Chun-Yi Liao, Taipei (TW)

(73) Assignee: Citpo Technologies Co., Ltd., Taipei (TW)

( * ) Notice: Subject to any disclaimer, the term of this patent is extended or adjusted under 35 U.S.C. 154(b) by 286 days.

(21) Appl. No.: 18/350,318

(22) Filed: Jul. 11, 2023

(65) Prior Publication Data

US 2024/0012020 A1 Jan. 11, 2024

(30) Foreign Application Priority Data

Jul. 11, 2022 (TW) .................................. 111125969

(51) Int. Cl.

| | |
|---|---|
| *G01P 15/093* | (2006.01) |
| *G01H 9/00* | (2006.01) |
| *G01P 1/00* | (2006.01) |
| *G01P 1/02* | (2006.01) |
| *G01P 15/03* | (2006.01) |
| *G01P 15/18* | (2013.01) |

(52) U.S. Cl.
CPC ........... *G01P 15/093* (2013.01); *G01H 9/004* (2013.01); *G01P 1/00* (2013.01); *G01P 1/023* (2013.01); *G01P 15/03* (2013.01); *G01P 15/18* (2013.01)

(58) Field of Classification Search
CPC ...... G01P 15/018; G01P 15/093; G01P 15/03; G01P 1/00; G01P 1/023; G01H 9/004
See application file for complete search history.

(56) References Cited

U.S. PATENT DOCUMENTS

| | | | | |
|---|---|---|---|---|
| 4,893,930 A * | 1/1990 | Garrett | ................... | G01H 9/004 |
| | | | | 356/477 |
| 5,973,317 A * | 10/1999 | Hay | ......................... | G01L 5/243 |
| | | | | 385/12 |
| 6,175,108 B1 * | 1/2001 | Jones | .................... | G01P 15/093 |
| | | | | 73/514.27 |
| 6,575,033 B1 * | 6/2003 | Knudsen | ............... | G01P 15/093 |
| | | | | 73/514.16 |
| 7,243,543 B2 * | 7/2007 | Berg | ...................... | G01H 9/004 |
| | | | | 356/477 |
| 2006/0219009 A1 * | 10/2006 | Maas | .................... | G01P 15/093 |
| | | | | 73/514.26 |

(Continued)

*Primary Examiner* — Helen C Kwok
(74) *Attorney, Agent, or Firm* — Alston & Bird LLP

(57) ABSTRACT

Provided herein are a three-directional accelerometer and a method for manufacturing the same. The three-directional accelerometer includes a three-layer frame, a core mass, three sets of spring leaves and three sets of optic fiber Bragg gratings (FBG's). The spring leaves that react to seismic motion of the mass are aligned perpendicular to one another in three dimensions. The spring leaves are significantly smaller in thickness than width, thus creating significant differences in moments of inertia, making the spring leaves sensitive only to mass vibration or acceleration in one direction. One set of FBG is responsible for sensing the corresponding mass vibration in one direction. The natural frequency in any direction can be adjusted by varying the mass/dimensions of the core mass, corresponding frame and stiffness of the spring leaves.

5 Claims, 10 Drawing Sheets

(56)                    References Cited

U.S. PATENT DOCUMENTS

| 2006/0236762 | A1* | 10/2006 | Meyer ....................... G01H 9/00 |
|  |  |  |  | 73/514.26 |
| 2007/0189658 | A1* | 8/2007 | Maas ....................... G01P 1/023 |
|  |  |  |  | 385/5 |
| 2015/0135832 | A1* | 5/2015 | Blumenkranz .......... G02B 6/34 |
|  |  |  |  | 73/514.26 |
| 2016/0091620 | A1* | 3/2016 | Paros ..................... G01V 1/185 |
|  |  |  |  | 73/514.02 |
| 2020/0233008 | A1* | 7/2020 | Kienitz ................. G01H 9/004 |
| 2022/0137088 | A1* | 5/2022 | Meijer ................. G01P 15/093 |
|  |  |  |  | 73/514.26 |
| 2023/0204360 | A1* | 6/2023 | Kim ....................... G01P 15/18 |
|  |  |  |  | 356/460 |

* cited by examiner

<u>200</u>

<u>200</u>

30

THREE-DIRECTIONAL ACCELEROMETER AND MANUFACTURING METHOD THEREOF

CROSS-REFERENCE TO RELATED APPLICATION AND CLAIM OF PRIORITY

The application claims the benefit of Taiwan Patent Application No. 111125969, filed on Jul. 11, 2022, at the Taiwan Intellectual Property Office, the disclosures of which are incorporated herein in their entirety by reference.

FIELD OF THE DISCLOSURE

The present disclosure generally relates to a three-directional accelerometer and, more particularly, to a monolithic three-directional accelerometer and a method for manufacturing the monolithic three-directional accelerometer using optical fiber Bragg gratings (FBG's) and a mass mechanism.

BACKGROUND OF THE DISCLOSURE

The optic fibers described herein have an elongated cylindrical structure that has pure silicon dioxide as its core. Generally, a single-mode optic fiber has a circular cross section with an interior diameter of 125 μm. The core is coated with acrylics with an overall diameter of 250 μm. A regular optic fiber can withstand a tensile strain up to 10,000 $\mu\varepsilon$. A brief description of the principles of FBG sensing techniques commonly used today is provided as follows:

FIG. 1 illustrates the principles of light reflection from an optic fiber Bragg grating (FBG). As shown in FIG. 1, the manufacturing of an FBG involves exposing a 1-20 mm long optic fiber 100, which includes an optic fiber core 101 coated by an acrylic layer 102, under high energy ultraviolet light that causes permanent periodic variations of the refraction index in that part of the optic fiber 100. The section of the optic fiber 100 with refraction index variation at a period of $\Lambda$ is called an FBG 103. When continuous and wide-band light 104 enters the optic fiber core 101 that includes the FBG 103, only light 105 with a special wavelength that meets the Bragg condition is reflected and the rest of the light 106 passes through the FBG 103. When the FBG 103 is subject to an external force or temperature variations to generate a strain ($\varepsilon_B$), the period of the grating $\Lambda$ changes, causing the wavelength of the reflected light 105 from the FBG 103 to shift. The original wavelength of the reflected light 105 is $\lambda_B$, and its variation is $\Delta\lambda_B$. The relation between $\Delta\lambda_B$ and $\varepsilon_B$ can be defined by the following equation:

$$\Delta\lambda_B = 0.74\lambda_B\varepsilon_B \text{ or } \varepsilon_B = \frac{\Delta\lambda_B}{(0.74\lambda_B)} \tag{1}$$

$\lambda_B$ of the FBG 103 that is commonly used is in a range from 1525 to 1575 nm, and the variation $\Delta\lambda_B$ that can be identified by a typical FBG interrogator is 1 pm. According to Equation (1), $\Delta\lambda_B$ of 1 pm corresponds to a strain $\varepsilon_B$ that is slightly less than $10^{-6}$, making the FBG 103 a stable and sensitive strain gauge.

The present disclosure relates to a method for manufacturing a sensing device capable of measuring acceleration in three mutually perpendicular directions using FBG as a sensing element, and a monolithic metallic mass as the core. fixation block FIG. 2 and FIG. 3 show a front view and a side view, respectively, of a one-directional FBG accelerometer. In FIG. 2 and FIG. 3, the one-directional FBG accelerometer 200 that uses four spring leaves 201 to connect the mass 202 to the frame 203 and two ends of the optical fiber 204 that includes two FBG's 205 are epoxied to the frame 203. The center of the optical fiber 204 is epoxied to the center of the mass 202. During vibration measurement, the frame 203 is fixed to the subject to be measured. The vibration thus transmits to the frame 203. The inertia causes the mass 202 to vibrate, and induces the two FBG's 205 to contract and extend, respectively, and thus causes their Bragg wavelengths to vary. The sensing of vibration is materialized via the Bragg wavelength variation $\Delta\lambda_B$.

The above-described FBG sensor mechanism can be simplified as a second order single-degree-of-freedom forced vibration system that consists of a collective mass 202, a collective stiffness k and a collective damper D. When the displacement generated by the frame 203 (or a vibration source) is x(t), as shown in FIG. 4, and the absolute displacement of the mass 202 within the frame 203 is y(t), the relative displacement between the mass 202 and the frame 203 is z(t)=y(t)−x(t), the reaction force generated by the spring leaves 201 is Sz(t)=S[y(t)−x(t)], and the damping resistance is D. In the formula for the spring force:

$$x(t)=d \cos(\omega t) \tag{2}$$

where $\omega$ is the angular frequency of the vibration, d is the amplitude of the vibration. Following the Newton's law of force equilibrium, the differential equation of the vibration system can be written as:

$$M\ddot{z}(t)=D\dot{z}(t)+Sz(t)=-M\ddot{x}(t) \tag{3}$$

Substituting Equation (2) into Equation (3), we obtain:

$$\ddot{z}(t) + 2\zeta\omega_0\dot{z}(t) + \omega_0^2 z(t) - d\omega^2\cos(\omega t) \tag{4}$$

where $\omega_o$ is the natural frequency, $\zeta$ is the damping ratio, and $$\omega_o = \left(\frac{S}{M}\right)^{1/2} \tag{5}$$

$$\zeta = \frac{D}{2\omega_o M} \tag{6}$$

$$z(t) = A\cos(\omega t - \phi) \tag{7}$$

$$A = \frac{d\varpi^2}{\sqrt{\left(1 - \varpi^2\right)^2 + \left(2\zeta\varpi^2\right)^2}} \tag{8}$$

$$\varpi = \frac{\omega}{\omega_o} \tag{9}$$

$$\tan\phi = \frac{2\zeta\varpi}{\left(1 - \varpi^2\right)} \tag{10}$$

When $\varpi \ll 1$, $\zeta < 1$, and $A \approx d\varpi^2$, Equation (7) can be simplified as:

$$z(t) \approx d\varpi^2\cos(\omega t - \phi) = -\frac{1}{\omega_o^2}\ddot{x} \tag{11}$$

As described above, the relative displacement of mass in reference to the sensor frame, z(t) is proportional to the to the acceleration of the sensor frame or vibration source, ẍ. Therefore, we can sense the acceleration associated with the vibration by measuring the displacement of the mass z. The relationship between z and the strain ε experienced by the FBG depends on the mechanism of the sensor device, and ε has a linear relationship with the Bragg wavelength variation $\Delta\lambda_B$ as shown in Equation (1). If properly designed there should be a linear relationship between ε and z, thus a linear relationship between $\Delta\lambda_B$ and ẍ.

As the design in FIG. 2 shows, the movements of the FBG and the mass are co-axial, hence, $$z(t)=L_{FBG}\varepsilon(t) \tag{12}$$

$L_{FBG}$ is the length of the FBG that connects the mass and the sensor frame. Thus, $$z(t) = L_{FBG}\varepsilon(t) = L_{FBG}\frac{\Delta\lambda_B}{\lambda_B(1-p_e)} = -\frac{1}{\omega_o^2}\ddot{x} \tag{13}$$

The above relation is a mathematical model of an FBG accelerometer or the transformation function between FBG reading $\Delta\lambda_B$ and vibration acceleration ẍ.

The current technologies that include electronic or micro-electromechanical systems (MEMS) sensing methods use electromagnetic, vibration frequency or electrical resistance to determine the acceleration. Some of these non-FBG accelerometers have the capabilities of three-directional measurement. The present disclosure emphasizes the use of FBG as the core sensing element in three-directional acceleration measurement.

FBG's and optical fibers are non-conductive. The stability is not affected by moisture or lightning FBG senses strains via wavelength, not affected by the light intensity, and thus maintains long term stability. For these reasons, FBG is rather suitable as a sensor element for field acceleration measurements. FIG. 2 and FIG. 3 provide a schematic view of a one-directional accelerometer using FBG as the sensing element. The direction of vibration and FBG/optical fiber in the sensor needs to be co-axial, and perpendicular to the spring leave planes. The thickness of the spring leaves is far less than their widths, thus making the sensor shown in FIG. 2 and FIG. 3 have significant sensitivity only in the direction of vibration due to differences in moment of inertia. As the mass moves along the direction of vibration, one of the two FBG's situated on opposite sides of the mass is compressed while the other FBG is extended. Subtracting the extension from the compression results in z (t), and simultaneously eliminates the temperature effects. However, the FBG accelerometer shown in FIG. 2 and FIG. 3 can only sense acceleration in one direction. Three FBG accelerometers are required when three-directional acceleration measurement is to be conducted, and that involves significantly higher cost and demands more space.

Therefore, the inventor, in view of the lack of conventional technology, has come up with the idea of the disclosure and finally developed a three-directional accelerometer and a method for manufacturing the same.

SUMMARY OF THE DISCLOSURE

One object of the present disclosure is to provide a three-directional accelerometer using a three-layered frame that shares a single core mass to manufacture a three-directional FBG accelerometer. The same function would require three individual one-directional accelerometers (each with its own mass) made with the current technology.

This new design can thus save two thirds of the mass and occupy much less volume with a simplified structure in comparison with the summation of three individual one-directional accelerometers. With the new design, the installation of the sensor is less complicated and requires less space.

Another object of the present disclosure is to provide a method for manufacturing a three-directional accelerometer containing a three-layered frame as a main body, a single piece of mass at the core of the three-layered frame, three sets of spring leaves and three sets of optical fiber Bragg gratings (FBG's). The spring leaves have their thicknesses far less than their widths. The three sets of the spring leaves are aligned so that each set is perpendicular to the other two sets in space. Each set of the spring leaves is only significantly responsive to the mass vibrations in one of the three directions. This arrangement enables the three sets of FBG's connected to the core mass to respectively sense the vibrations of the core mass in three directions. The natural frequency of the accelerometer for a given direction can be controlled by adjusting the stiffness of the spring leaves and the total mass of the materials contained within the frame associated with that direction.

Still another object of the present disclosure is to provide a method for manufacturing a three-directional accelerometer, in which the accelerometer has a three-layered frame, a core mass situated at the center of the frame, three sets of spring leaves and three sets of FBG's. Each of the three layers within the frame is perpendicular to the other two layers. Each of the three sets of spring leaves has a significant response to the mass vibrations in the three corresponding directions. The three FBG sets sense the movements of the core mass in the three corresponding directions. The natural frequency of the accelerometer in any of the three directions can be adjusted by varying the total mass of the three-layered frame and/or dimensions and thus stiffness of the corresponding spring leaves.

A further object of the present disclosure is to provide a three-directional accelerometer that includes a core mass, a three-layered frame that houses the core mass at its center. Each of the three layers is mutually perpendicular to the other two layers. Each of the three layers is responsible to enable sensing the vibration of the core mass in the three directions. Three sets of FBG's that respectively connect the core mass to the three layers are used to measure vibrations in the three directions. The natural frequency of the accelerometer in any of the three directions can be adjusted by varying the total mass of a frame layer and/or dimensions and thus stiffness of the corresponding spring leaves.

To achieve the foregoing objects, the present disclosure provides a method for manufacturing a three-directional accelerometer, wherein the three-directional accelerometer has a main body with a three-layered frame, a core mass disposed in the three-layered frame, three sets of spring leaves and three sets of fiber Bragg gratings (FBG's), and a thickness of each set of spring leaves is relatively much smaller than a width thereof. The method includes the steps of: arranging, in a three-dimensional space, one set of spring leaves to be perpendicular to the other two sets of spring leaves; causing each set of spring leaves to be responsive to a vibration of the core mass in only one of three directions in the three-dimensional space; causing each of the three sets of FBG's to sense a respective acceleration of the core mass along a specific one of the three directions to obtain a respective directional component of the core mass along the specific one of the three directions; and causing a natural frequency of the three-directional accelerometer along the specific one of the three directions to be adjustable according to a mass and/or a size of the core mass or the three-layered frame, and/or a stiffness of at least one of the three sets of spring leaves.

The present disclosure further provides a three-directional accelerometer, including: a three-layered frame including three sub-frames with one sub-frame being perpendicular to two other sub-frames in a three-dimensional space; a core mass disposed in the three-layered frame; three sets of spring leaves connected between the three-layered frame and the core mass; and three sets of FBG's connected between the three-layered frame and the core mass. Each set of spring leaves is responsive to a vibration of the core mass in a specific one of three directions in the three-dimensional space. The three sets of FBG's sense a respective acceleration of the core mass along a specific one of the three directions according to a respective directional component of the core mass along the specific one of the three directions. A natural frequency of the three-directional accelerometer along the specific one of the three directions is adjustable according to a mass and/or a size of the core mass or the three-layered frame, and/or a stiffness of at least one of the three sets of spring leaves.

The present disclosure further provides a three-directional accelerometer, including: a core mass; a frame configured to accommodate the core mass therein, wherein the frame is responsive to a specific vibration of the core mass in any one dimension of a three-dimensional space; and three sets of fiber Bragg gratings (FBG's) each connected to the core mass and the frame to sense a respective acceleration of the core mass along the any one dimension.

For further descriptions and advantages of the present disclosure, please refer to the subsequent drawings and embodiments, so as to understand the technical solutions of the present disclosure more clearly.

BRIEF DESCRIPTION OF THE DRAWINGS

The above embodiments and advantages of the present disclosure will become more readily apparent to those ordinarily skilled in the art after reviewing the following detailed descriptions and accompanying drawings.

DETAILED DESCRIPTION OF THE PREFERRED EMBODIMENTS

Figure 1:
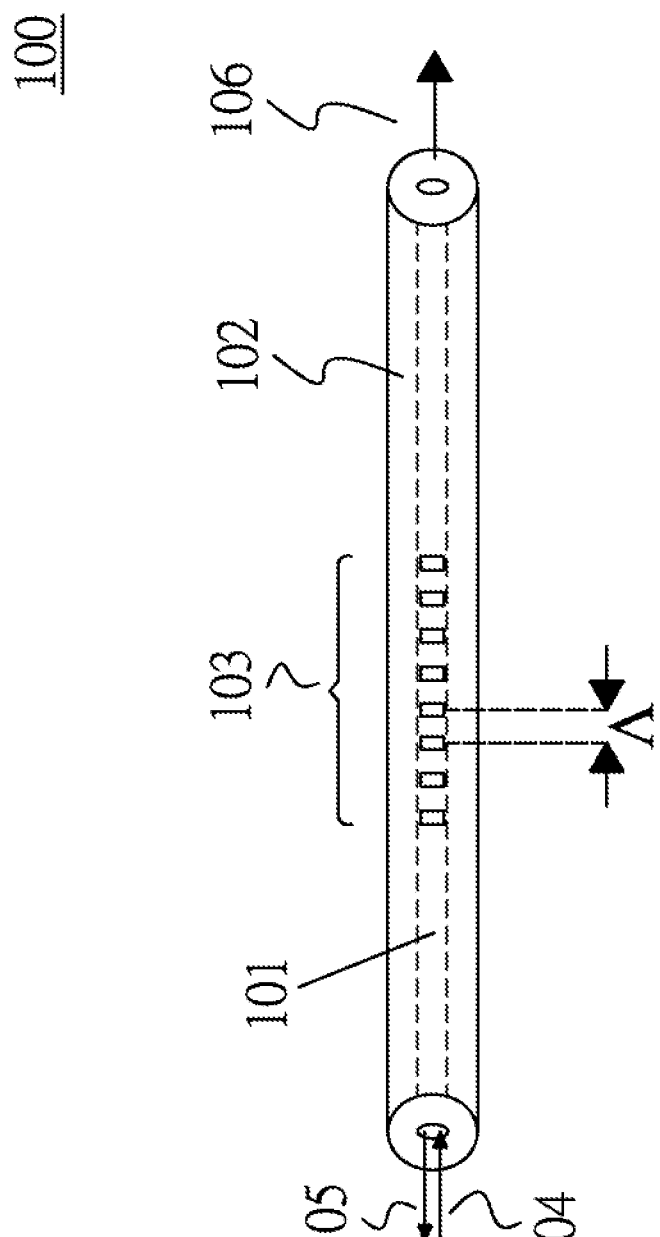
FIG. 1 is a schematic diagram showing the principle of light reflection from an FBG.
Figure 2:
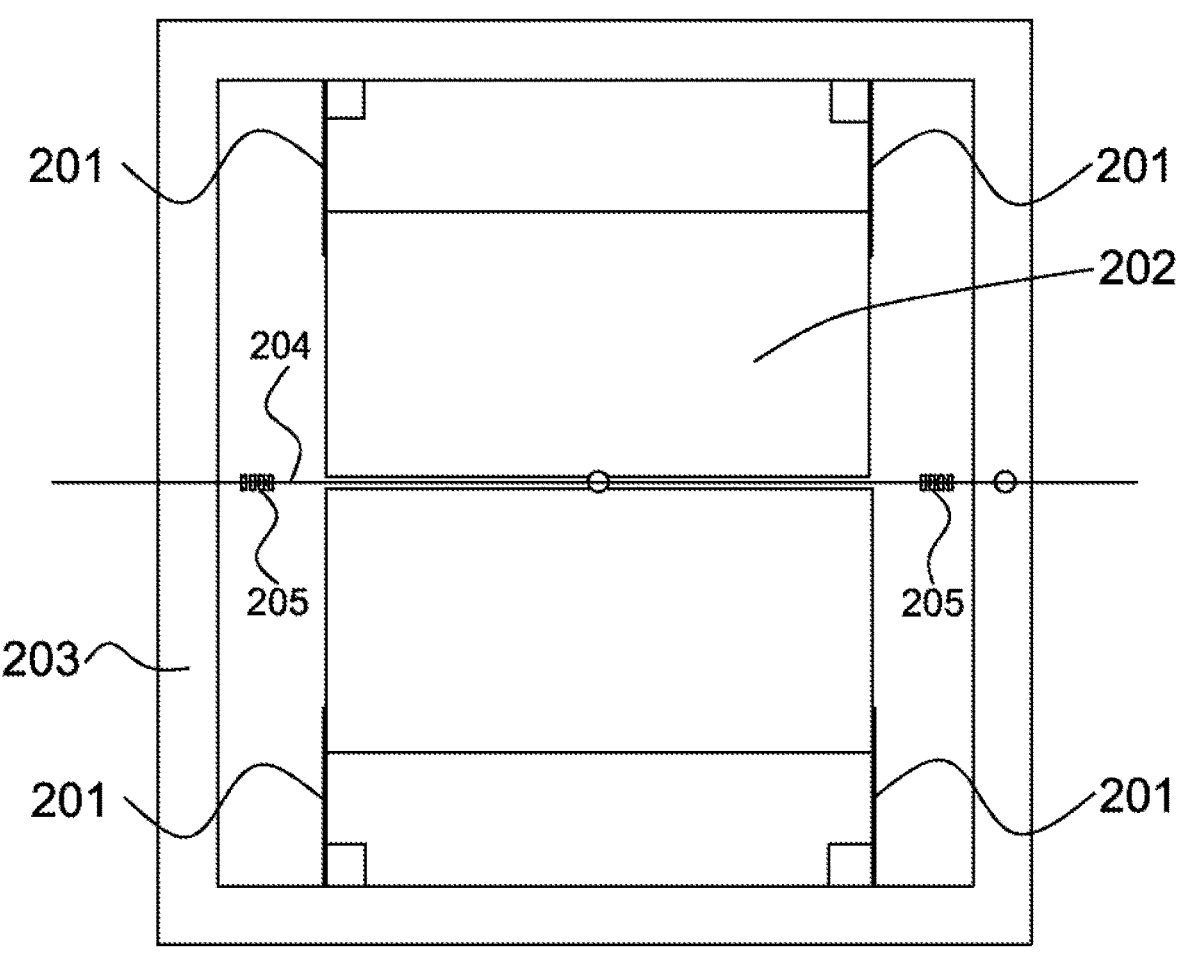
FIG. 2 shows a front view of the structure of a one-directional FBG accelerometer.
Figure 3:
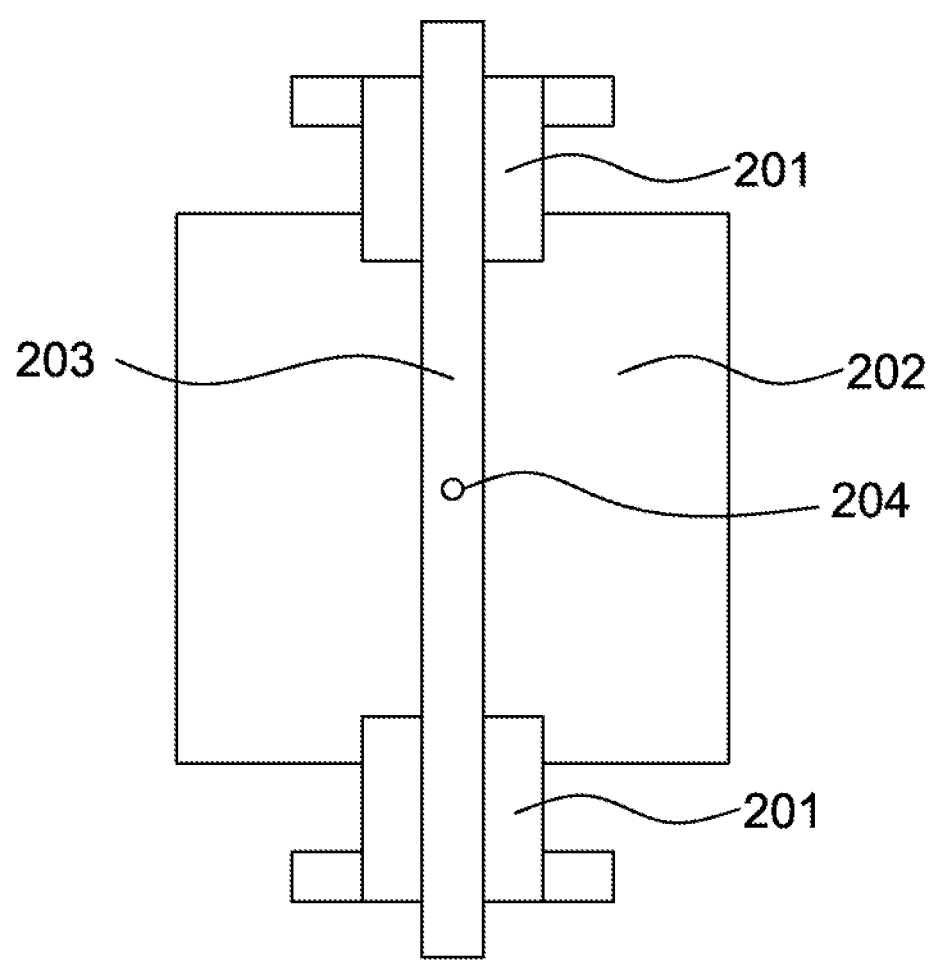
FIG. 3 shows a side view of the structure of a one-directional FBG accelerometer.
Figure 4:
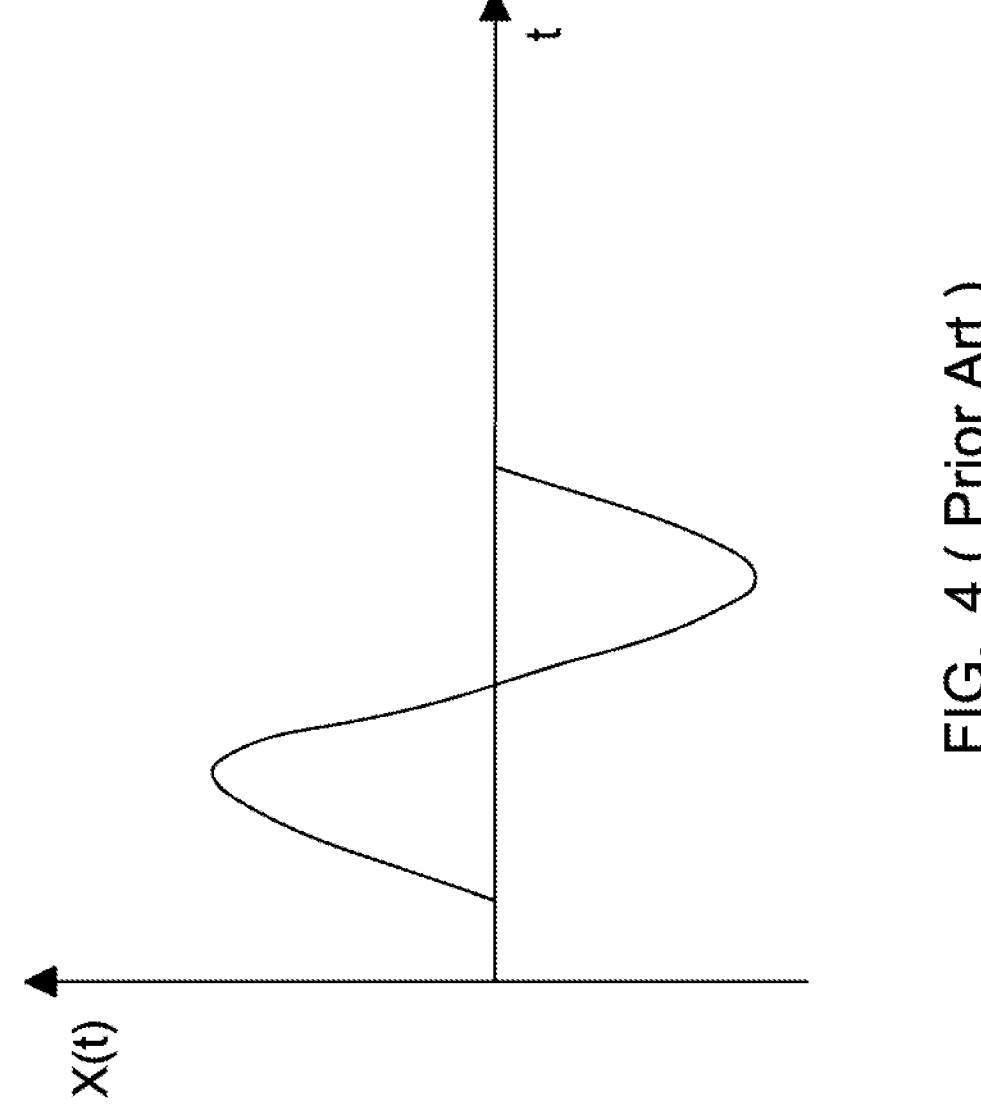
FIG. 4 is a graph showing a vibration vs. time relation of a frame (or source).
Figure 5A:
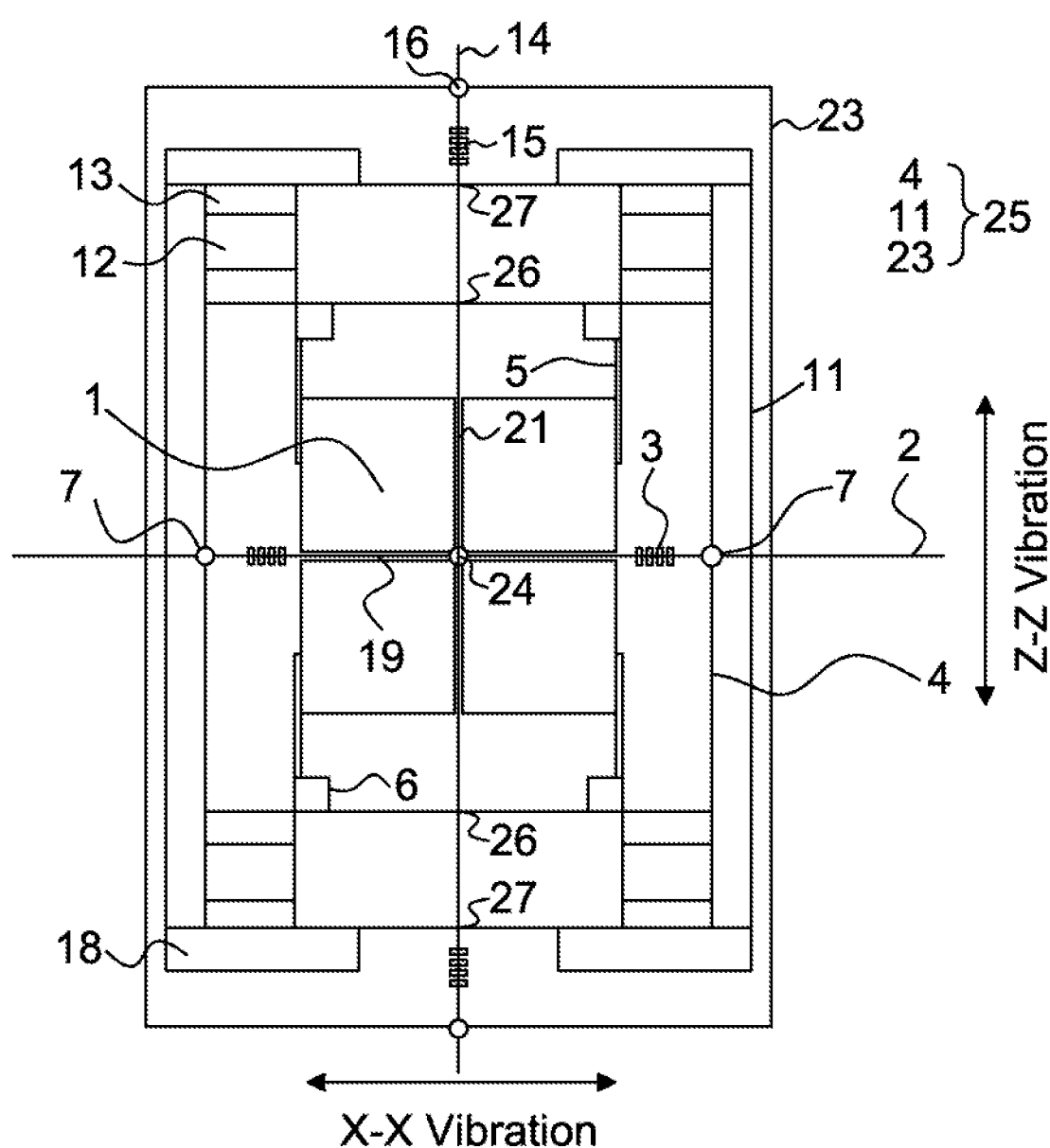
FIG. 5A is a schematic diagram showing a front view of a three-directional accelerometer according to a preferred embodiment of the present disclosure.
Figure 5B:
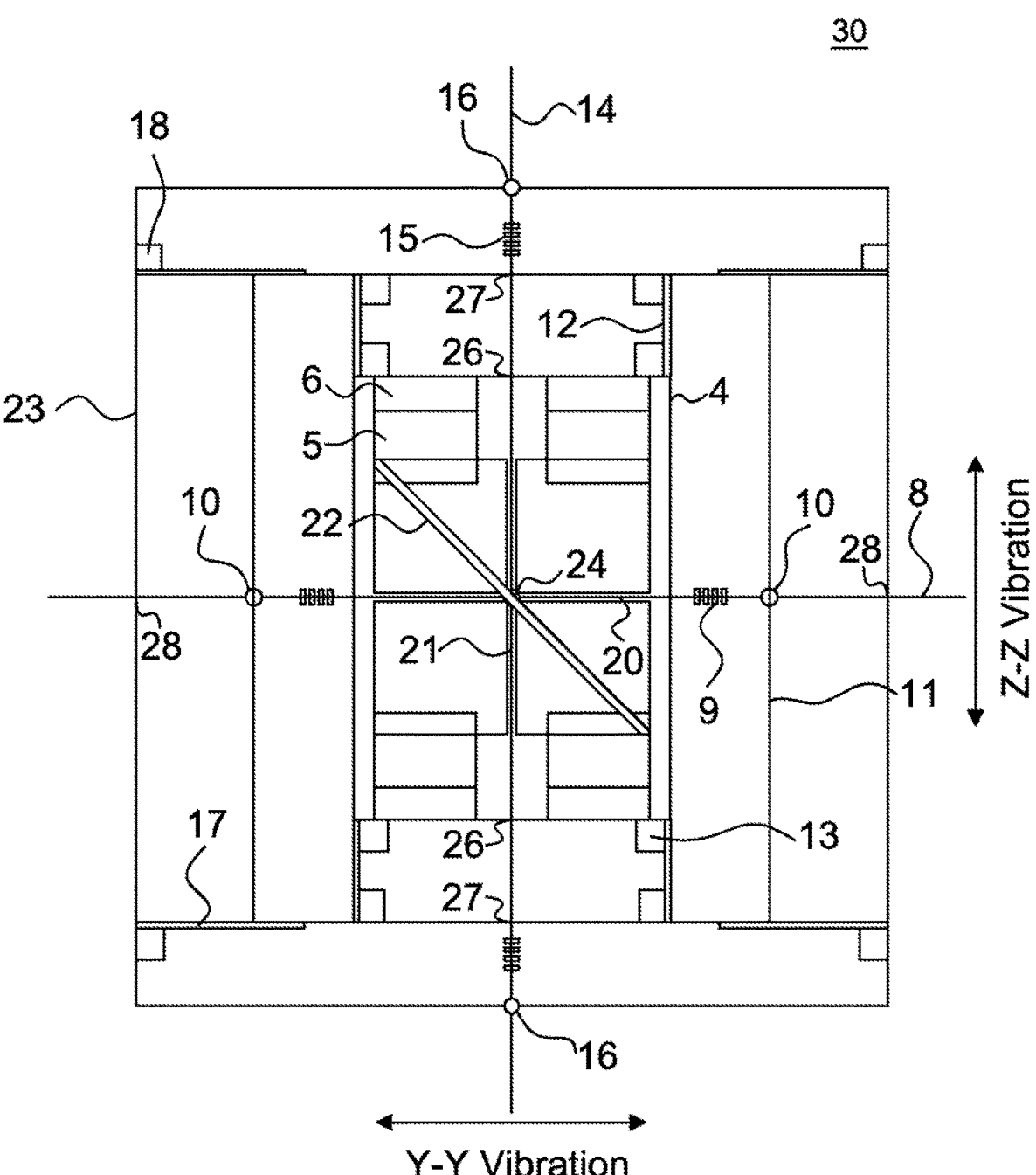
FIG. 5B is a schematic diagram showing a right side view of a three-directional accelerometer according to a preferred embodiment of the present disclosure.
Figure 6A:
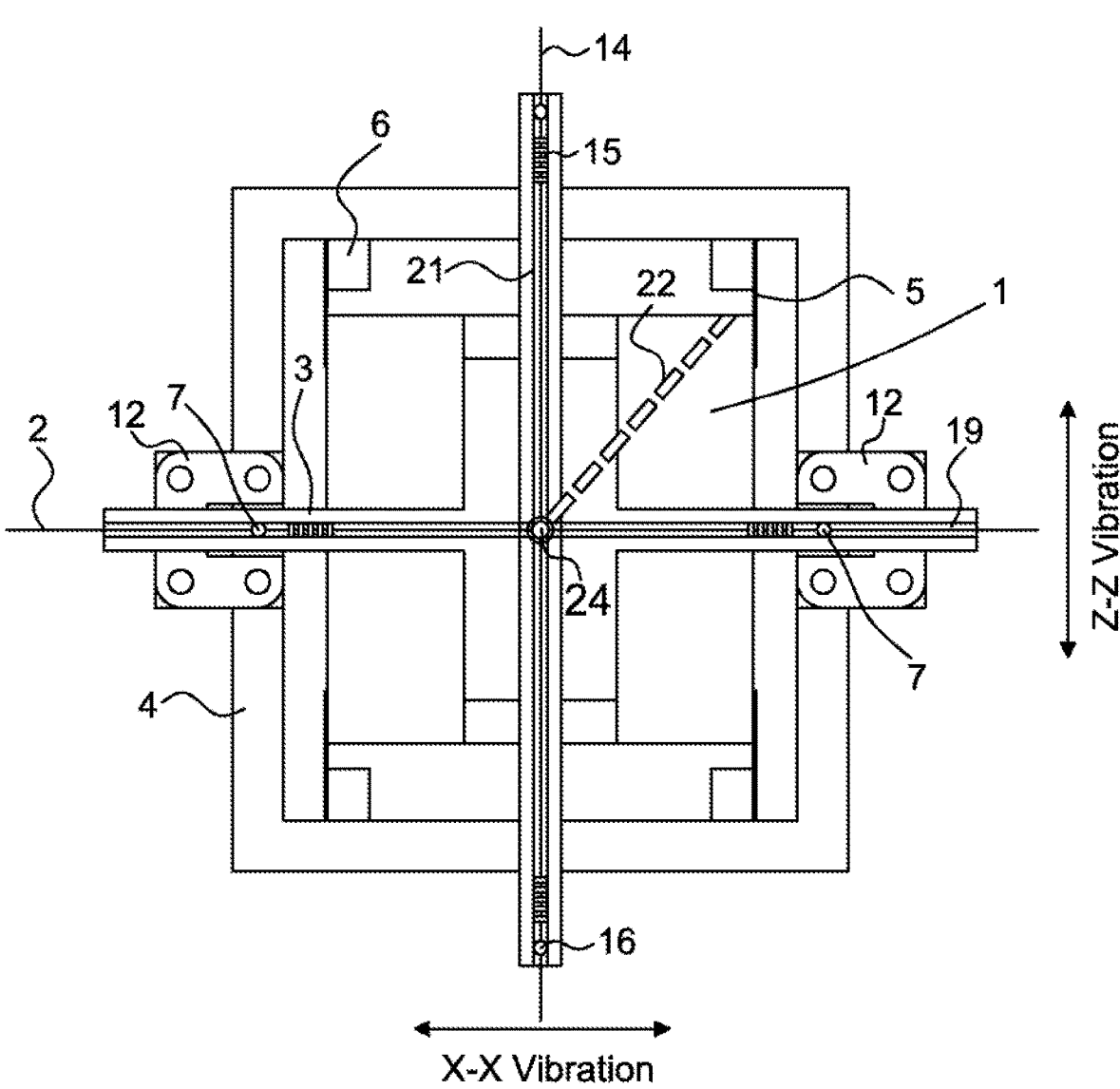
FIG. 6A is a schematic diagram showing a front view of a three-directional accelerometer according to a preferred embodiment of the present disclosure.
Figure 6B:
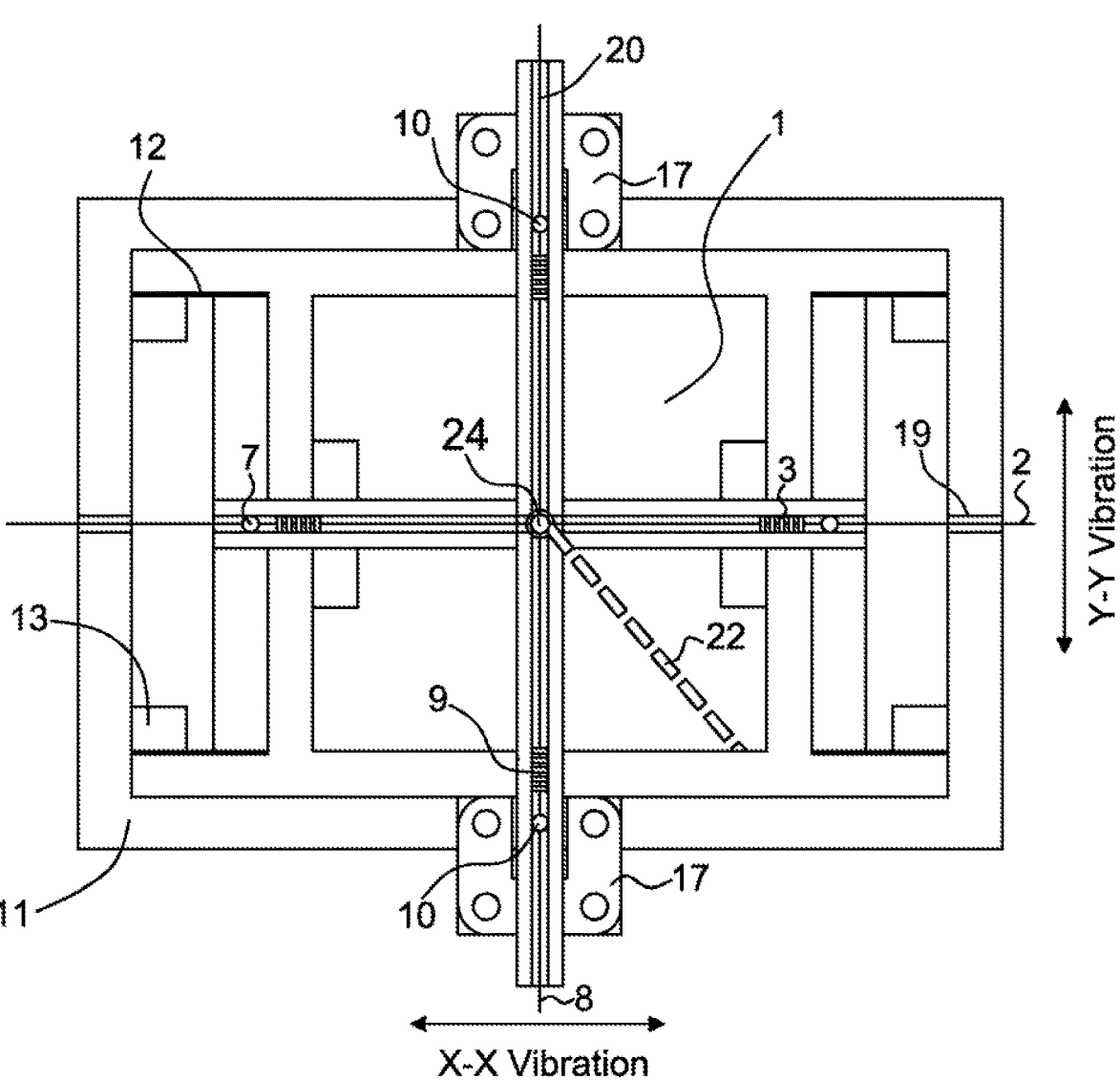
FIG. 6B is a schematic diagram showing a top view of a three-directional accelerometer according to a preferred embodiment of the present disclosure.
Figure 6C:
FIG. 6C is a schematic diagram showing a right side view of a three-directional accelerometer according to a preferred embodiment of the present disclosure.

Referring to FIG. 5A to FIG. 5B and FIG. 6A to FIG. 6C, the present disclosure provides a three-directional accelerometer 30, in which the design involves a main body that includes a three-layered frame 25 (including an innermost sub-frame 4, an intermediate sub-frame 11 and an outermost sub-frame 23), and shares a core mass 1. According to the 3D schematic diagram with the three-dimensional space coordinate system shown in FIG. 7 (where the three sets of optic fibers are not shown), the three mutually perpendicular directions of X, Y and Z are described. The three-direction accelerometer 30 provided in the present disclosure is illustrated using three-directional front views (as shown in FIG. 6A to FIG. 6C). The three-directional front views include a front view parallel to the X-X axis and the Z-Z axis (as shown in FIG. 6A), a front view parallel to the Y-Y axis and the Z-Z axis (as shown in FIG. 6C), and a front view parallel to the X-X axis and the Y-Y axis (as shown in FIG. 6B). This three-direction FBG accelerometer 30 is characterized by using a single core mass 1.

Referring to FIG. 5A to FIG. 5B, the single core mass 1 is made of a metal cube with mass M. A hole 19, 20 and 21 is drilled in X-X, Y-Y and Z-Z directions, respectively, to pass through the center of the core mass 1. The diameter of these holes 19, 20 and 21 must be large enough to house the optical fiber (with a diameter of 0.25 mm) and easy to drill. An epoxy injection hole 22 with a diameter of 5 mm is drilled through the center of the core mass 1 and along a diagonal direction. An optical fiber 2, 8 and 14 that includes two FBG's is threaded through the drilled holes 19, 20 and 21, respectively. The three optical fibers 2, 8 and 14 meet at the center 24 of the core mass 1. Epoxy is injected via the diagonal epoxy injection hole 22 to fix the optical fibers 2, 8 and 14 at the center 24 of the core mass 1.

Referring to FIG. 6A to FIG. 6C, the three-layered frame 25 is made of metal and is square or rectangular in shape. The three-layered frame 25 is stiff enough so that it does not deform under vibration. The X-X directional sub-frame 4 must be able to house the core mass 1 and connect to four spring leaves 5. The four spring leaves 5 in the X-X direction use fixation blocks 6 respectively to fix the core mass 1 to the X-X directional sub-frame 4. The spring leaves 5 serve the purpose of supporting the core mass 1 and function of a spring. The three-directional accelerometer 30 presented in the present disclosure can optimize its natural frequency in the X-X direction by varying the mass of the core mass 1 and/or stiffness of the spring leaves 5 in the X-X direction. The total mass of the core mass 1 and other mechanical components inside the X-X directional sub-frame 4 is designated as $M_x$.

Referring to FIG. 6A to FIG. 6C, the X-X directional sub-frame 4 has a hole 7 in the center of X-X direction that allows the passage of the optical fiber 2 in the X-X direction. The optical fiber 2 in the X-X direction is epoxied onto the X-X directional sub-frame 4 under a pretension. A hole 16 is drilled at the center from top to bottom of the X-X directional sub-frame 4 to allow the passage of the optical fiber 14 in the Z-Z direction without being epoxied.

Referring to FIG. 6A to FIG. 6C, the Y-Y directional sub-frame 11 uses four spring leaves 12 in the Y-Y direction and four fixation blocks 13 to fix the X-X directional sub-frame 4 inside the Y-Y directional sub-frame 11. A hole 10 is drilled in the center from top to bottom of the Y-Y directional sub-frame 11 to allow the passage of the optical fiber 8 in the Y-Y direction. The optical fiber 8 in the Y-Y direction is epoxied onto the Y-Y directional sub-frame 11 under a pretension. A hole 7 is drilled at the center from left to right of the Y-Y directional sub-frame 11 to allow the passage of the optical fiber 2 in the X-X direction without being epoxied. Components within the Y-Y directional sub-frame 11 include the core mass 1 and other attachments associated with the X-X directional sub-frame 4. The total mass for the components within the Y-Y directional sub-frame 11 is designated as $M_y$.

Referring to FIG. 6A to FIG. 6C, the Z-Z directional sub-frame 23 uses four spring leaves 17 in the Z-Z direction and four fixation blocks 18 to fix the Y-Y directional sub-frame 11 inside the Z-Z directional sub-frame 23. A hole 16 is drilled in the center from top to bottom of the Z-Z directional sub-frame 23 to allow the passage of the optical fiber 14 in the Z-Z direction. The optical fiber 14 in the Z-Z direction is epoxied onto the Z-Z directional sub-frame 23 under a pretension. A hole 10 is drilled at the center from left to right of the Z-Z directional sub-frame 23 to allow the passage of the optical fiber 8 in the Y-Y direction without being epoxied.

Referring to FIG. 5A to FIG. 5B, the optical fiber 2 in the X-X direction includes two FBG's 3 placed respectively at the space between the core mass 1 and the X-X directional sub-frame 4. The optical fiber 8 in the Y-Y direction includes two FBG's 9 placed respectively at the space between the X-X directional sub-frame 4 and the Y-Y directional sub-frame 11. The optical fiber 14 in the Z-Z direction includes two FBG's 15 placed respectively at the space between the Y-Y directional sub-frame 11 and the Z-Z directional sub-frame 23. The three sets of FBG's 3, 9 and 15 individually sense their tensile and compressive strains resulting from vibrations of the core mass 1, components within the Y-Y directional sub-frame 11 and the Z-Z directional sub-frame 23.

Referring to FIG. 6A to FIG. 6C, the natural frequency in X-X, Y-Y and Z-Z directions of this three-directional accelerometer 30 can be individually adjusted by varying the mass of the core mass 1, the total mass $M_x$ of the components within the Y-Y directional sub-frame 11, the total mass $M_y$ of the components within the Z-Z directional sub-frame 23 and/or stiffness of the spring leaves 5, 12 and 17 respectively in the X-X direction, Y-Y direction and Z-Z direction.

A method of manufacturing a three-directional accelerometer 30 will be described herein according to FIG. 5A to FIG. 5B and FIG. 6A to FIG. 6C. The core mass 1 can be produced using a monolithic material including stainless steel, aluminum, or copper. The selected material and dimension depend on the desired natural frequency. The involved machining method to manufacture the components includes lathing, milling or wire cutting machining.

After machining all the components, the three optical fibers 2, 8, and 14, each with two FBG's 3, 9, and 15, are epoxied and fixed to the center 24 of the core mass 1.

The core mass 1 is connected to the X-X directional sub-frame 4 using the spring leaves 5 in the X-X direction, and the optical fiber 2 in the X-X direction is pretensioned and epoxied onto the X-X directional sub-frame 4.

The X-X directional sub-frame 4 with its attached components is connected to the Y-Y directional sub-frame 11 using the spring leaves 12 in the Y-Y direction, and the optical fiber 8 in the Y-Y direction is pretensioned and epoxied onto the Y-Y directional sub-frame 11.

The Y-Y directional sub-frame 11 with its attached components is connected to the Z-Z directional sub-frame 23 using the spring leaves 17 in the Z-Z direction, and the optical fiber 14 in the Z-Z direction is pretensioned and epoxied onto the Z-Z directional sub-frame 23.

The present disclosure further provides a method of manufacturing a three-directional accelerometer 30 that will be described herein according to FIG. 5A to FIG. 5B, FIG. 6A to FIG. 6C and FIG. 7. The three-directional accelerometer 30 includes: a main body 25 having three sub-frames 4, 11 and 23; a core mass 1 disposed at the center of the three sub-frames 4, 11 and 23; three sets of spring leaves 5, 12, and 17; and three sets of FBG's 3, 9 and 15. The spring leave sets 5, 12, and 17 are mutually perpendicular. The spring leaves 5, 12, and 17 have their thicknesses far less than their respective widths making the spring leaves respond significantly only to vibrations in X-X, Y-Y or Z-Z directions. The three sets of FBG's 3, 9 and 15 sense vibrations of the three-directional accelerometer 30 individually in X-X, Y-Y or Z-Z directions. The natural frequency of the three-directional accelerometer 30 in X-X, Y-Y or Z-Z direction can be individually adjusted by varying the mass of the core mass 1, the total mass of the components within sub-frames 4 and 11 and/or the stiffness of the spring leaves 5, 12, and 17.

As the method described above, in the three-dimensional space spanned by the X-X, Y-Y and Z-Z directions, the core mass 1 has a mass of M and a center 24. The method uses three sets of optical fibers 2, 8 and 14, and each includes two FBG's. The three sets of FBG's are respectively designated as 3, 9 and 15. The core mass 1 is made of a cubical metal. A first hole 19, a second hole 20, and a third hole 21 are drilled to pass through the center 24 in the X-X, Y-Y and Z-Z directions respectively, in the core mass 1. These drilled holes 19, 20 and 21 have their diameters lager than those of the optical fibers 2, 8 and 14. An epoxy injection hole 22 is drilled in the diagonal direction to pass through the center 24 of the core mass 1. The diagonally drilled epoxy injection hole 22 is used to inject epoxy that will fix all three optical fibers 2, 8 and 14 at the center 24 of the core mass 1.

As described above, the three-directional accelerometer 30 includes three sets of spring leaves 5, 12 and 17. There are four spring leaves 5 in the X-X direction, four spring leaves 12 in the Y-Y direction, and four spring leaves 17 in the Z-Z direction. The three-layered frame 25, as a main body, has an innermost sub-frame 4 is in the X-X direction, the intermediate sub-frame 11 in the Y-Y direction and the outermost sub-frame 23 in the Z-Z direction. The spring leaves 5, 12, and 17 are configured to support the core mass 1 and serve as springs. The sub-frames 4, 11 and 23 are machined from a square or rectangular shaped piece of metal. The sub-frames 4, 11 and 23 are firm enough so that they will not deform under vibration. A first space 29a, a second space 29b and a third space 29c (in FIG. 7) within the pane of all three sub-frames 4, 11 and 23 provide room for each sub-frame or mass to vibrate. The four spring leaves 5 in the X-X direction use four fixation blocks 6 respectively to fix the core mass 1 to the X-X directional sub-frame 4. The sub-frame 4 in the X-X direction is sized so that it has enough space to house the core mass 1, the set of spring leaves 5 and the set of fixation blocks 6 in the X-X direction. The natural frequency of the three-directional accelerometer 30 in the X-X direction can be adjusted by varying the mass of the core mass 1 and/or stiffness of the spring leaves 5 in the X-X direction.

As described above, the three optical fibers 2, 8 and 14 are in the X-X direction, the Y-Y direction and the Z-Z direction, respectively. A hole 7 is drilled at the center from left to right of the X-X directional sub-frame 4 and a hole 16 drilled at the center from top to bottom of the X-X directional sub-frame 4. The hole 7 from left to right of the X-X directional sub-frame 4 allows the optical fiber 2 in the X-X direction to pass through and be epoxied onto the X-X directional sub-frame 4 under pretension. The hole 16 from top to bottom of the X-X directional sub-frame 4 allows the optical fiber 14 in the Z-Z direction to pass through without being epoxied.

As described above, the three-directional accelerometer 30 includes four fixation blocks 13 that facilitate connection between the four spring leaves 12 in the Y-Y direction and the X-X directional sub-frame 4 placed inside the Y-Y directional sub-frame 11. A hole 10 is drilled at the center from top to bottom of the Y-Y directional sub-frame 11 and a hole 7 is drilled at the center from left to right of the Y-Y directional sub-frame 11. The hole 10 from top to bottom of the Y-Y directional sub-frame 11 allows the optical fiber 8 in the Y-Y direction to pass through and be epoxied onto the Y-Y directional sub-frame 11 under pretension. The hole 7 from left to right of the Y-Y directional sub-frame 11 allows the optical fiber 2 in the X-X direction to pass through without being epoxied. The total mass of the core mass 1 and other components within the X-X directional sub-frame 4 but excluding the mass of the X-X directional sub-frame 4 itself, is designated as $M_x$. The total mass of the components within the Y-Y directional sub-frame 11 including the core mass 1, the X-X directional sub-frame 4 and other components excluding the mass of the Y-Y directional sub-frame 11 itself, is designated as $M_y$. The total mass of the components within the Z-Z directional sub-frame 23 including the core mass 1, the X-X directional sub-frame 4, Y-Y directional sub-frame 11 and other components excluding the mass of the Z-Z directional sub-frame 23 itself, is designated as $M_z$.

As described above, the three-directional accelerometer 30 includes four fixation blocks 18 that facilitate connection between the four spring leaves 17 in the Z-Z direction and the Y-Y directional sub-frame 11 placed inside the Z-Z directional sub-frame 23. A hole 16 is drilled at the center from top to bottom of the Z-Z directional sub-frame 23 and a hole 10 is drilled at the center from left to right of the Z-Z directional sub-frame 23. The hole 16 from top to bottom of the Z-Z directional sub-frame 23 allows the optical fiber 14 in the Z-Z direction to pass through and be epoxied onto the Z-Z directional sub-frame 23 under pretension. The hole 10 from left to right of the Z-Z directional sub-frame 23 allows the optical fiber 8 in the Y-Y direction to pass through without being epoxied.

As described above, the optical fiber 2 in the X-X direction includes two FBG's 3, the optical fiber 8 in the Y-Y direction includes two FBG's 9, and the optical fiber 14 in the Z-Z direction includes two FBG's 15. The installation involves placing two FBG's 3 between the core mass 1 and the X-X directional sub-frame 4, two FBG's 9 between the core mass 1 and the Y-Y directional sub-frame 11, and two FBG's 15 between the Y-Y directional sub-frame 11 and the Z-Z directional sub-frame 23. The three sets of FBG's 3, 9 and 15 use the induced tensile/compressive strains to individually sense the vibration of the core mass 1 in the X-X direction sub-frame 4, the Y-Y directional sub-frame 11 in the Y-Y direction and the Z-Z directional sub-frame 23 in the Z-Z direction.

As described above, the three-directional accelerometer 30 allows the natural frequency in the X-X, Y-Y and Z-Z directions to be adjusted by individually varying $M_x$, $M_y$ and $M_z$ in association with, if necessary with the stiffness of the spring leaves 5 in the X-X direction, spring leaves 12 in the Y-Y direction and spring leaves 17 in the Y-Y direction.

The present disclosure provides a method for manufacturing a three-directional accelerometer 30 (referring to FIG. 5A to FIG. 5B, FIG. 6A to FIG. 6C and FIG. 7). The three-directional accelerometer 30 includes a three-layered frame 25 as a main body, a core mass 1 situated at the center of the sub-frames 4, 11 and 23, three sets of spring leaves 5, 12, and 17 and three sets of FBG's 3, 9 and 15. The sub-frames 4, 11 and 23 are mutually perpendicular. The spring leaves 5, 12, and 17 respond significantly only to vibrations in the X-X, Y-Y or Z-Z directions (referring to FIG. 7 for coordinate directions). The three sets of FBG's 3, 9 and 15 sense vibrations of the three-directional accelerometer 30 individually in the X-X, Y-Y or Z-Z directions. The natural frequency of the three-directional accelerometer 30 in the X-X, Y-Y or Z-Z direction can be individually adjusted by varying the mass of the core mass 1, the total mass of the components within the sub-frames 4, 11 and 23 and/or stiffness of the spring leaves 5, 12, and 17.

As described above, the three sets of spring leaves 5, 12 and 17 are perpendicular to one another in a three-dimensional space.

The present disclosure provides a method for manufacturing a three-directional accelerometer 30 (referring to FIG. 5A to FIG. 5B, FIG. 6A to FIG. 6C and FIG. 7), the accelerometer 30 includes a three-layered frame 25 as a main body. The three-layered frame 25 includes three sub-frames 4, 11 and 23 that are mutually perpendicular to one another in a three-dimensional space. A core mass 1 is situated at the center of the sub-frames 4, 11 and 23. Three sets of spring leaves 5, 12, and 17 are configured to connect the core mass 1 and the sub-frames 4, 11 and 23. The spring leaves 5, 12, and 17 respond significantly only to vibrations in the X-X, Y-Y or Z-Z directions (referring to FIG. 7 for coordinate directions). Three sets of FBG's 3, 9 and 15 connect the core mass 1 and the sub-frames 4, 11 and 23. The three sets of FBG's 3, 9 and 15 sense vibrations of the accelerometer 30 individually in the X-X, Y-Y or Z-Z direction. The natural frequency of the accelerometer 30 in the X-X, Y-Y or Z-Z direction can be individually adjusted by varying the mass of the core mass 1, the total mass of the components within the sub-frames 4, 11 and 23 and/or stiffness of the spring leaves 5, 12, and 17.

As described above, the three-directional accelerometer 30 involves three sets of spring leaves 5, 12, and 17 that are used individually to connect the core mass 1 to the X-X directional sub-frames 4, the X-X directional sub-frame 4 to the Y-Y directional sub-frame 11, and the Y-Y directional sub-frame 11 to the Z-Z direction sub-frame 23. Three sets of FBG's 3, 9 and 15 are contained individually in the optical fibers 2, 8 and 14. Three holes 19, 20 and 21 are drilled individually in the X-X, Y-Y and Z-Z directions through the center 24 of the core mass 1. The three drilled holes 19, 20 and 21 have their diameters larger than that of the optical fibers. An additional hole 22 is drilled in the diagonal direction through the core mass 1 to facilitate injecting epoxy for fixation of the optical fibers 2, 8 and 14 to the center 24 of the core mass 1.

Figure 7:
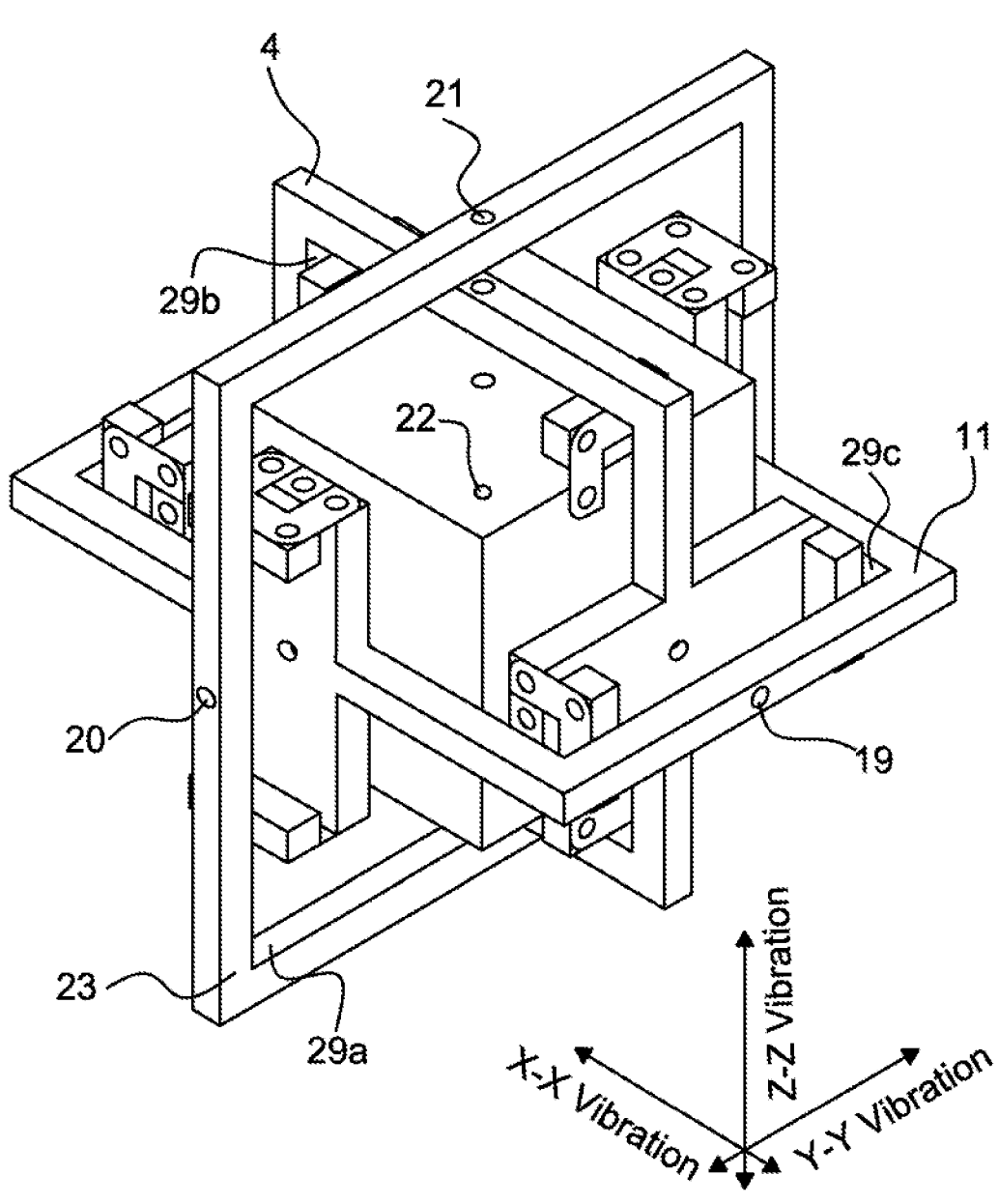
FIG. 7 shows a 3-D schematic view of a three-directional accelerometer according to a preferred embodiment of the present disclosure.

As described above, the three-directional accelerometer 30 includes three sets of spring leaves 5, 12 and 17. There are four spring leaves 5 in the X-X direction, four spring leaves 12 in the Y-Y direction, and four spring leaves 17 in the Z-Z direction. All spring leaves 5, 12, and 17 are configured to support the core mass 1 and provide reaction forces in response to vibration as springs. The three-layered frame 25 includes an innermost sub-frame 4, an intermediate sub-frame 11 and an outermost sub-frame 23. Each sub-frame has an open space 29a, 29b and 29c within the sub-frames, as shown in FIG. 7. The open spaces 29a, 29b and 29c are either square or rectangular in shape machined from a piece of metal. The central axis of these three spaces 29a, 29b and 29c is individually parallel to the X-X, Y-Y and Z-Z directions. The three sub-frames 4, 11 and 23 possess sufficient stiffness so that they do not deform when subject to vibrations. The innermost sub-frame 4 is in the X-X direction, the intermediate sub-frame 11 is in the Y-Y direction and the outermost sub-frame 23 is in the Z-Z direction. The X-X directional sub-frame 4 should be large enough to house the core mass 1, the four spring leaves 5 and the four fixation blocks 6 configured to connect the core mass 1 to the X-X directional sub-frame 4. The natural frequency in the X-X direction of the three-directional accelerometer 30 can be adjusted by varying the mass of the core mass 1 and/or the stiffness of the spring leaves 5.

As described above, the three-directional accelerometer 30 includes three optical fibers 2, 8 and 14. The optical fiber 2 is in the X-X direction, the optical fiber 8 is in the Y-Y direction and the optical fiber 14 is in the Z-Z direction. A hole 7 is drilled at the center from left to right of the X-X directional sub-frame 4 and a hole 16 is drilled at the center from top to bottom of the X-X directional sub-frame 4. The hole 7 from left to right the X-X directional sub-frame 4 allows the optical fiber 2 in the X-X direction to pass through and be epoxied onto the X-X directional sub-frame 4 under pretension. The hole 16 from top to bottom of the X-X directional sub-frame 4 allows the optical fiber 14 in the Z-Z direction to pass through without being epoxied. The total mass of the core mass 1 and other components within the X-X directional sub-frame 4 but excluding the mass of the X-X directional sub-frame 4 itself, is designated as $M_x$. The total mass of the components within the Y-Y directional sub-frame 11 including the core mass 1, the X-X directional sub-frame 4 and other components excluding the mass of the Y-Y directional sub-frame 11 itself, is designated as $M_y$. The total mass of the components within the Z-Z directional sub-frame 23 including the core mass 1, the X-X directional sub-frame 4, Y-Y directional sub-frame 11 and other components excluding the mass of the Z-Z directional sub-frame 23 itself, is designated as $M_z$.

As described above, the three-directional accelerometer 30 includes four fixation blocks 13 for spring leaves 12 in the Y-Y direction. The X-X directional sub-frame 4 uses four spring leaves 12 and four fixation blocks 13 to fix the X-X directional sub-frame 4 inside the Y-Y directional sub-frame 11. A hole 10 is drilled at the center from top to bottom of the Y-Y directional sub-frame 11 and a hole 7 is drilled at the center from left to right of the Y-Y directional sub-frame 11. The hole 10 from top to bottom of the Y-Y directional sub-frame 11 allows the optical fiber 8 in the Y-Y direction to pass through and be epoxied onto the Y-Y directional sub-frame 11 under pretension. The holes 7 from left to right of the Y-Y directional sub-frame 11 allows the optical fiber 2 in the X-X direction to pass through without being epoxied. The natural frequency in the Y-Y direction of the three-directional accelerometer 30 can be adjusted by varying the $M_y$ and/or the stiffness of the spring leaves 12.

As described above, the three-directional accelerometer 30 includes four fixation blocks 18 for the spring leaves 17 in the Z-Z direction. The Y-Y directional sub-frame 11 uses four spring leaves 17 and four fixation blocks 18 to fix the Y-Y directional sub-frame 11 inside the Z-Z directional sub-frame 23. A hole 16 is drilled at the center from top to bottom of the Z-Z directional sub-frame 23 and a hole 10 is drilled at the center from left to right of the Z-Z directional sub-frame 23. The holes 16 from top to bottom of the Z-Z directional sub-frame 23 allows the optical fiber 14 in the Z-Z direction to pass through and be epoxied onto the Z-Z directional sub-frame 23 under pretension. The holes 10 from left to right of the Z-Z directional sub-frame 23 allows the optical fiber 8 in the Y-Y direction to pass through without being epoxied. The natural frequency in the Z-Z direction of the three-directional accelerometer 30 can be adjusted by varying the $M_z$ and/or the stiffness of the spring leaves 17.

As described above, the three-directional accelerometer 30, in which the two FBG's contained in the optical fiber 2 in the X-X direction are designated as 3. The two FBG's are located respectively in the space between the core mass 1 and the X-X directional sub-frame 4. The two FBG's contained in the optical fiber 8 in the Y-Y direction are designated as 9. The two FBG's are located respectively in the space between the X-X directional sub-frame 4 and Y-Y directional sub-frame 11. The two FBG's contained in the optical fiber 14 in the Z-Z direction are designated as 15. The two FBG's are located respectively in the space between the Y-Y directional sub-frame 11 and Z-Z directional sub-frame 23. The three sets of FBG's 3, 9 and 15 individually sense the tensile/compressive strains resulted from vibrations in the X-X direction of the core mass 1, vibrations in the Y-Y direction of the components within Y-Y directional sub-frame 11 and vibrations in the Z-Z direction of the components within the Z-Z directional sub-frame 23.

The present disclosure further provides a three-directional accelerometer 30 (referring to FIG. 5A to FIG. 5B, FIG. 6A to FIG. 6C and FIG. 7) including: a core mass 1 located inside a three-layered frame 25. The three-layered frame 25 includes three sub-frames 4, 11 and 23 that are mutually perpendicular in a three-dimensional space and individually respond to vibrations in X-X, Y-Y and Z-Z direction (referring to FIG. 7 for the X-X, Y-Y and Z-Z directions). There are three sets of FBG's 3, 9 and 15 along with their associated optical fibers that individually connect the core mass 1 to the X-X directional sub-frame 4, the X-X directional sub-frame 4 to the Y-Y directional sub-frame 11 and the Y-Y directional sub-frame 11 to the Z-Z directional sub-frame 23. The three sets of FBG's 3, 9 and 15 individually sense vibrations of the three-directional accelerometer 30 in the X-X, Y-Y and Z-Z directions. The natural frequency of in any of the three directions can be individually adjusted by varying $M_x$, $M_y$ and $M_y$ and/or related spring leave stiffnesses.

As described above, in the three-directional accelerometer 30, the three-layered frame 25 includes three sub-frames 4, 11 and 23 that are mutually perpendicular in a three-dimensional space. The three-directional accelerometer 30 includes three sets of spring leaves 5, 12, and 17 that individually connect the core mass 1 to the X-X directional sub-frame 4, the X-X directional sub-frame 4 to the Y-Y directional sub-frame 11, and the Y-Y directional sub-frame 11 to the Z-Z directional sub-frame 23. The three sub-frames 4, 11 and 23 individually sense vibrations of the three-directional accelerometer 30 in the X-X, Y-Y and Z-Z directions (referring to FIG. 7 for the X-X, Y-Y and Z-Z directions).

In the three-directional accelerometer 30 described above, the related parameters include the mass and dimensions of the core mass 1, dimensions of the three sub-frames 4, 11 and 23 and stiffness of the spring leaves 5, 12, and 17.

The present disclosure further provides a three-directional accelerometer 30 made from a three-layered frame 25 that shares a single core mass 1. Since it combines three currently known one-directional accelerometers (each with its own core mass) into one, two thirds of the core mass can be eliminated with a much-reduced volume in comparison with the summation of the three one-directional accelerometers. With the simple structure, the complexity and required space required for the installation of the three-directional accelerometer 30 can be significantly reduced. As such, the present disclosure is novel and non-obvious.

While the disclosure has been described in terms of what is presently considered to be the most practical and preferred embodiments, it is to be understood that the disclosure need not be limited to the disclosed embodiments. On the contrary, it is intended to cover various modifications and similar arrangements included within the spirit and scope of the appended claims which are to be accorded with the broadest interpretation so as to encompass all such modifications and similar structures.

The invention claimed is:

1. A three-directional accelerometer, comprising:
   a core mass;
   a frame configured to accommodate the core mass therein, wherein the frame is responsive to a specific vibration of the core mass in any one dimension of a three-dimensional space;
   a set of spring leaves; and
   three sets of fiber Bragg gratings (FBG's) each connected to the core mass and the frame to sense a respective acceleration of the core mass along the any one dimension,
   wherein:
      the frame comprises a first sub-frame and a second sub-frame;
      the first sub-frame houses the core mass;
      the second sub-frame surrounds the first sub-frame; and
      the set of spring leaves is connected between the first sub-frame and the second sub-frame.

2. The three-directional accelerometer of claim 1, wherein the frame is a three-layered frame and comprises the first sub-frame, the second sub-frame, and a third sub-frame, each of which is perpendicular to two other sub-frames in the three-dimensional space and is responsive to the specific vibration.

3. The three-directional accelerometer of claim 1, wherein a natural frequency of the three-directional accelerometer along the any one dimension is adjustable according to a mass and/or a size of the core mass or the frame.

4. The three-directional accelerometer of claim 1, wherein:
   the set of spring leaves is a first set of spring leaves and the frame is a three-layered frame and comprises a second set of spring leaves and a third set of spring leaves,
   the second set of spring leaves is connected between the first sub-frame and the core mass,
   the third set of spring leaves is connected between the second sub-frame and the third sub-frame, and
   each set of spring leaves is responsive to a vibration of the core mass in one of three directions in the three-dimensional space.

5. The three-directional accelerometer of claim 1, wherein:
   the three sets of FBG's are incorporated with three optic fibers, respectively;
   the core mass has a center, from which there are provided with a first, a second, and a third optic fiber holes along three directions in the three-dimensional space such that the three optic fibers all pass through the core mass;
   an epoxy injection hole is provided along a diagonal direction of the core mass; and
   the three optic fibers are intersected at the center and are epoxied to the core mass at the center through the epoxy injection hole.

* * * * *